United States Patent [19]

Burgess

[11] 4,176,949

[45] Dec. 4, 1979

[54] MICROFICHE EXPOSER

[75] Inventor: Dennis A. Burgess, Minneapolis, Minn.

[73] Assignee: Burgess Industries, Inc., Minneapolis, Minn.

[21] Appl. No.: 930,855

[22] Filed: Aug. 3, 1978

[51] Int. Cl.² ........................................... G03B 27/22
[52] U.S. Cl. ..................................... 355/104; 355/30; 355/117
[58] Field of Search ................... 355/49, 85, 104–111, 355/117, 30; 219/216, 471

[56] References Cited

U.S. PATENT DOCUMENTS

| | | | |
|---|---|---|---|
| 2,459,362 | 1/1949 | Cary | 355/110 |
| 2,895,395 | 7/1959 | Gern | 355/104 |
| 2,918,857 | 12/1959 | Frantz | 355/107 |
| 2,921,513 | 1/1960 | Frantz | 355/107 |
| 2,983,210 | 5/1961 | Baril, Jr. et al. | 355/106 |
| 3,207,896 | 9/1965 | Meaney et al. | 250/65 |
| 3,361,047 | 1/1968 | Breuers | 355/110 |
| 3,409,367 | 11/1968 | Thomiszer | 355/106 |
| 3,441,347 | 4/1969 | Lassig et al. | 355/104 |
| 3,442,589 | 5/1969 | Ishikawa et al. | 355/106 |
| 3,447,872 | 6/1969 | Pfaff | 355/110 |
| 3,600,507 | 8/1971 | Newgard et al. | 355/49 X |
| 3,628,859 | 12/1971 | Zucker | 355/49 X |
| 3,632,208 | 1/1972 | Bach | 355/108 |
| 3,639,060 | 2/1972 | Jaskowsky | 355/104 |
| 3,749,491 | 7/1973 | Maxfield et al. | 355/106 |
| 3,762,814 | 10/1973 | Kitch | 355/30 |
| 3,958,880 | 5/1976 | Washio et al. | 355/106 |

Primary Examiner—Richard A. Wintercorn
Attorney, Agent, or Firm—Merchant, Gould, Smith, Edell, Welter & Schmidt

[57] ABSTRACT

A rotary open-ended tubular drum of transparent material is supported within a housing by a pair of spaced support rolls and an endless flexible belt entrained over a pair of spaced apart feed rolls, the belt being generally opposed to the support rolls. The belt and drum are driven by a motor to feed a master sheet and a sensitized sheet to be printed, in face-to-face contact, between a drum engaging feeding flight portion of the belt and the portion of the drum engaged by the belt. An ultraviolet lamp is mounted in outwardly spaced relation to one end of the drum, and delivers ultraviolet light axially toward the interior of the drum. A stationary mirror within the drum is positioned to reflect ultraviolet light from the lamp toward an interior surface of the portion of the drum that is engaged by the feeding flight of the belt. A mask within the drum confines the reflected light to a given limited portion of the drum, and cooling fans are used to maintain the drum in a cool condition and to remove heated air from the housing.

7 Claims, 9 Drawing Figures

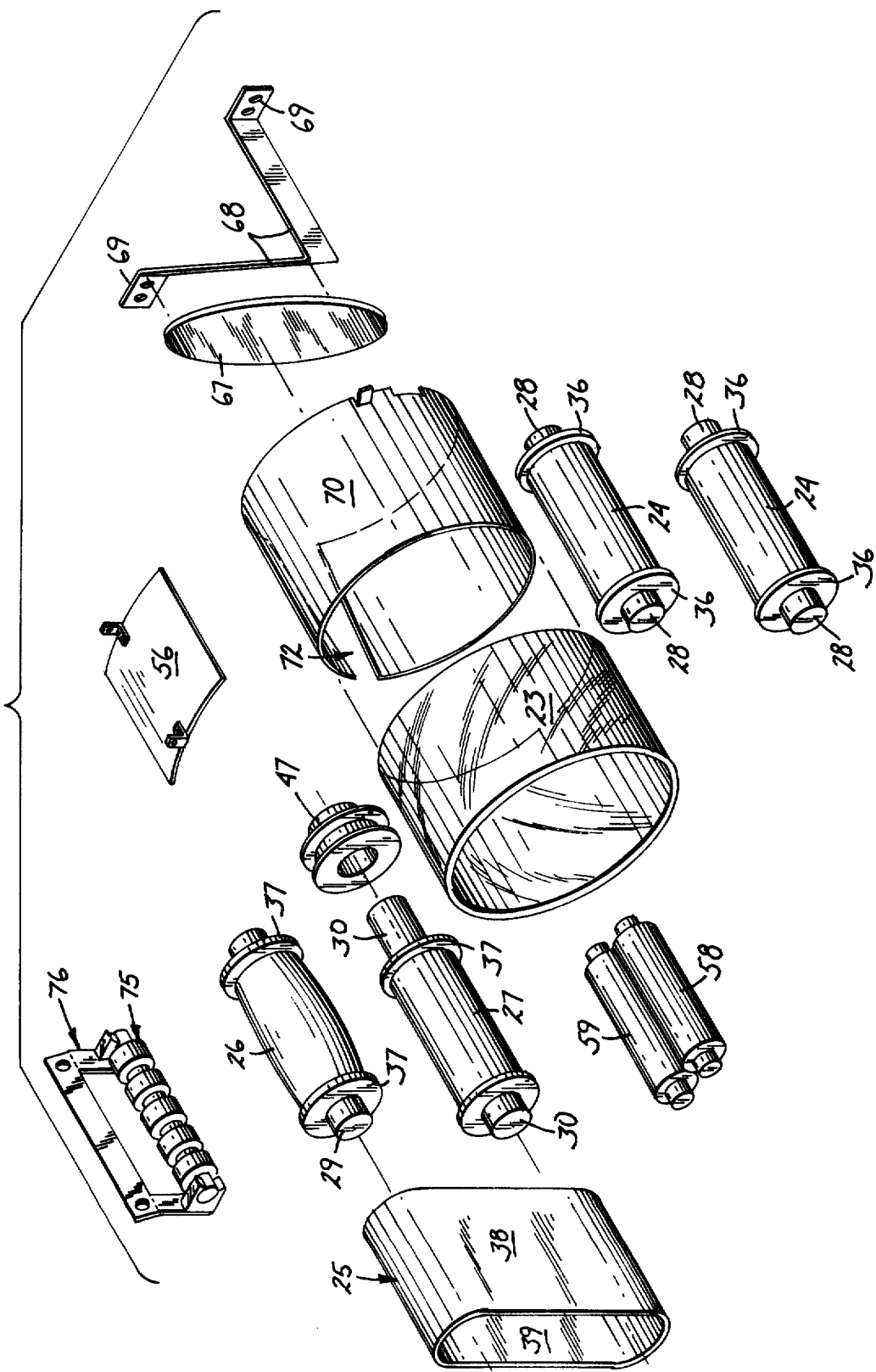

MICROFICHE EXPOSER

This invention relates generally to copying devices, and more particularly to devices for reproducing, on a sensitized sheet, material that is printed on a master film. The device of this invention is intended for use with sheet material having a printing emulsion that is sensitive only to ultraviolet light in high quantity, so that a contact printing operation can be carried on in a normally illuminated room, rendering a dark room unnecessary.

A problem in using an ultraviolet light source is that of isolating the contact printing area from infrared heat radiation generated in the light source, to avoid impairing the image carrying ability of the emulsion on the copying material. In connection with this problem is that of transferring the generated heat away from the mechanical working parts of the device as well as the operator, in the interest of longevity of the device as well as comfort to the user.

Another problem in copying devices of the type set forth is that of maintaining the master film and sensitized sheet to be printed in close face-to-face engagement during exposure to the light source, so that the image from the master film is faithfully reproduced.

SUMMARY OF THE INVENTION

In overcoming the above-mentioned and other problems, I provide a microfiche exposer which comprises a housing, a rotary open-ended tubular drum of transparent material, means supporting said drum in said housing for rotation on its own axis, a pair of spaced apart feed rolls journaled within the housing on axes parallel to the axis of the drum, and a flexible belt entrained over said feed rolls and having a feeding flight between said rolls entrained over a circumferentially extended outer surface portion of said drum for reception of a master film and a sensitized sheet in face-to-face engagement between said outer surface of the drum and said feeding flight. An ultraviolet lamp is mounted in said housing axially outwardly of one end of said drum, and is disposed to direct ultraviolet light axially into said drum. The exposer further includes a mirror, means mounting the mirror in a stationary position within said drum and disposing said mirror to reflect light from said lamp in a direction radially of said drum toward the interior surface of the area thereof engaged by said belt, means for imparting film and sheet conveying movement to said belt and rotation to said drum, and means for moving a current of cooling air longitudinally through said drum.

BRIEF DESCRIPTION OF THE DRAWING

FIG. 9 is an exploded perspective view of the printing mechanism of this invention.

DETAILED DESCRIPTION OF THE PREFERRED EMBODIMENT

Figure 3:
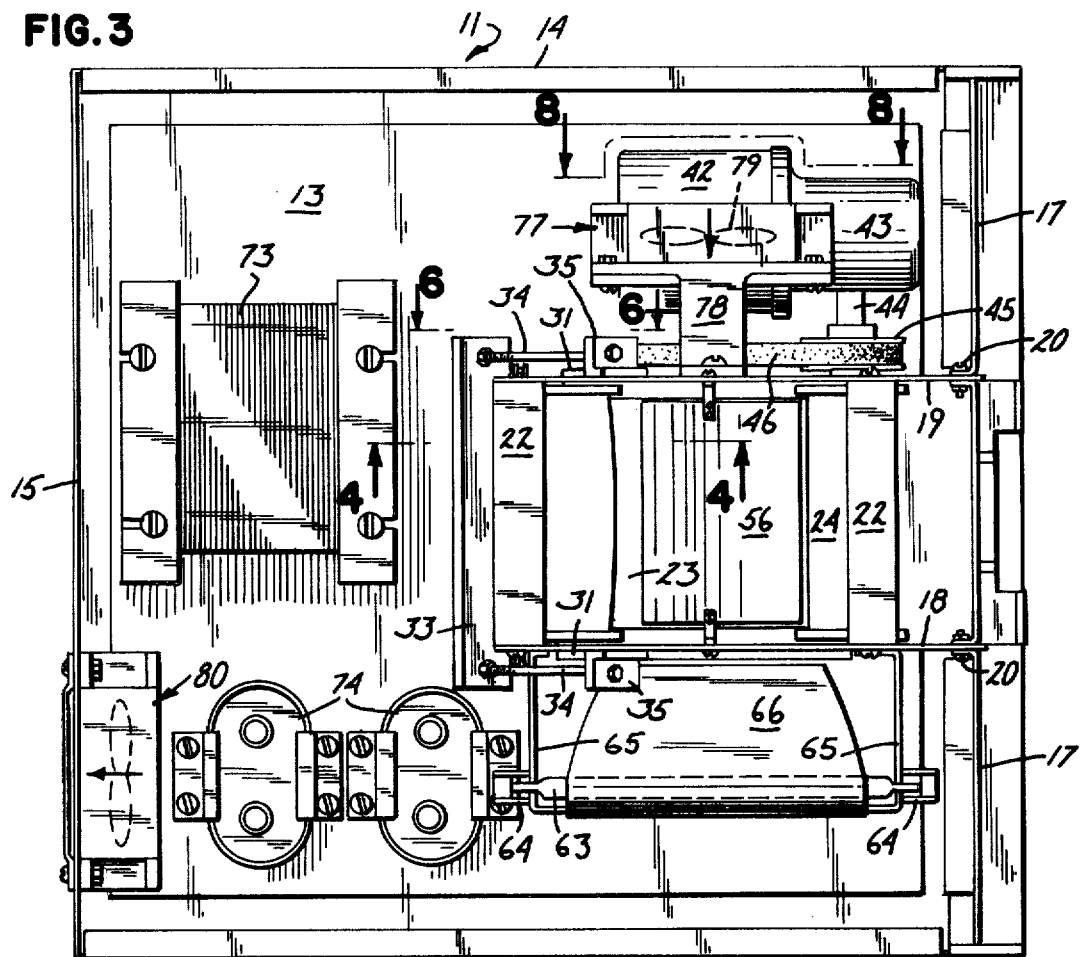
FIG. 3 is a view in top plan, some parts being removed.

The apparatus of this invention includes a housing indicated generally at 11, the housing having top and bottom walls 12 and 13 respectively, opposite side walls 14, a rear wall 15, and a front wall comprising an intermediate front wall section 16 and a pair of laterally outer front wall sections 17 that are connected at their outer edges to respective ones of the side walls 14, and at their inner edges to side edge portions of the intermediate front wall section 16. As shown in FIG. 3, the front ends of a pair of laterally spaced partitions 18 and 19 are interposed between the adjacent edge portions of the front wall sections 16 and 17, the wall sections 16 and 17 and partitions 19 being held together by suitable means, such as nut-equipped screws or the like 20. The partitions 18 and 19 are provided with aligned circular openings 21 the purpose of which will be described hereinafter. As shown in FIG. 3, the partitions 18 and 19 are braced by a pair of struts 22 at their upper edges.

An open-ended tubular drum of transparent material, such as glass, is indicated at 23, and is disposed between the partitions 18 and 19 generally coaxial with the openings 21 in the partitions 18 and 19. The drum 23 is supported by a pair of generally vertically spaced support rolls 24 that are axially aligned with the drum 23 and an endless flexible belt 25 that is entrained over a pair of generally vertically spaced feed rolls 26 and 27, the rolls 24, 26 and 27 being disposed on axes parallel to the axis of the drum 23, the rolls 24 having shaft portions 28 that are suitably journaled in the partitions 18 and 19. In like manner, the feed rolls 26 and 27 have respective shafts 29 and 30, the shafts 30 being also journaled in the partitions 18 and 19. The shafts 29 are journaled in bearings 31 supported by bearing brackets 32 slidably mounted in the partitions 18 and 19 for movements of the feed roll 36 generally toward and away from the roll 27, the bearing brackets 32 being connected by a cross member 33. The member 33 is carried by a pair of lock nut equipped adjustment bolts 34 rotatably mounted in brackets 35 on the partitions 18 and 19, and screw threaded in the cross member 33. As shown in FIGS. 3 and 9, the support rolls 24 are provided with end flanges 36 that engage the opposite ends of the drum 23 to limit axial movement of the drum 23. In like manner, the feed rolls 26 and 27 have end flanges 37 that limit sideways movement of the belt 25 axially of the feed rolls 26 and 27.

Figure 7:
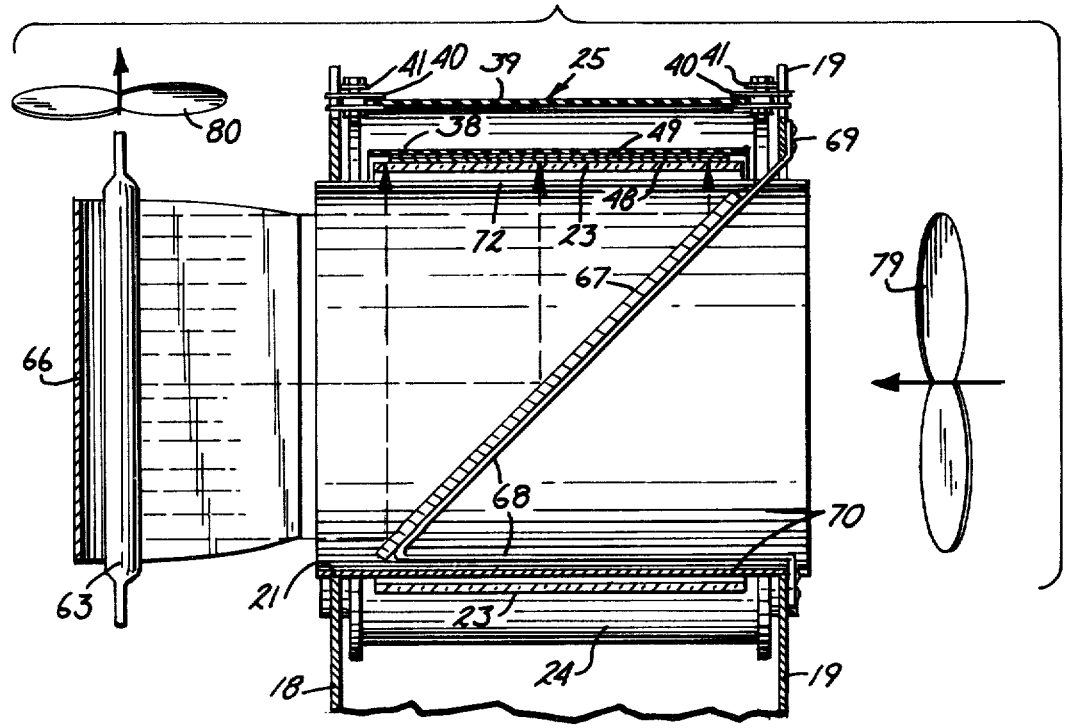
FIG. 7, sheet 2, is a horizontal section taken on the line 7—7 of FIG. 4, portions thereof being shown diagrammatically.
Figure 4:
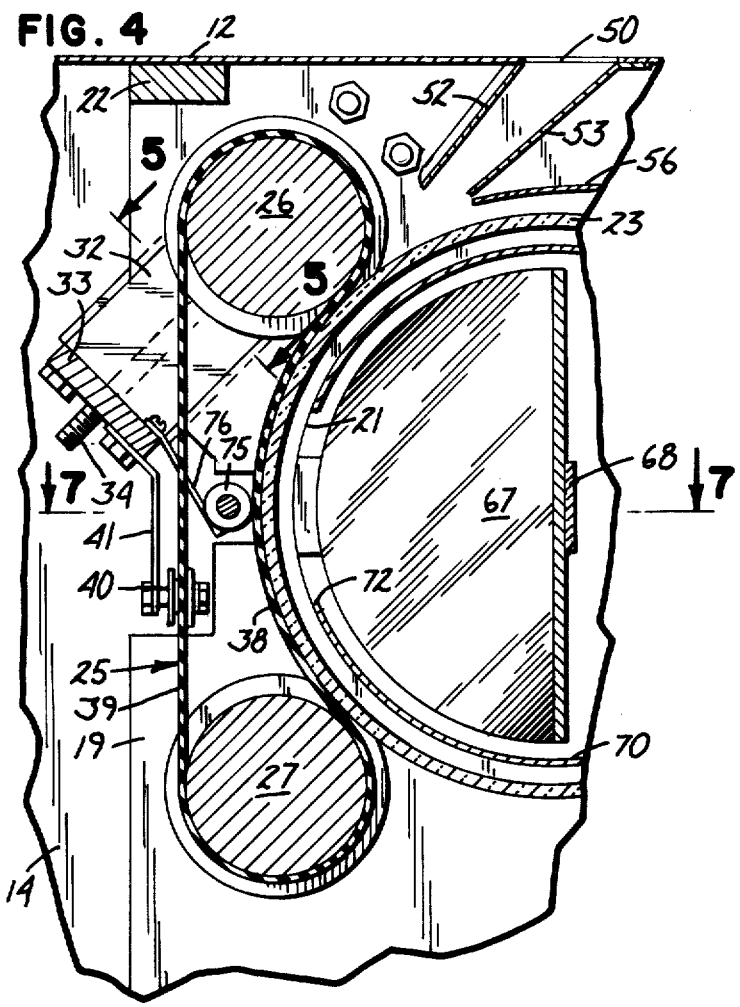
FIG. 4 is an enlarged fragmentary section taken on the line 4—4 of FIG. 3.
Figure 5:
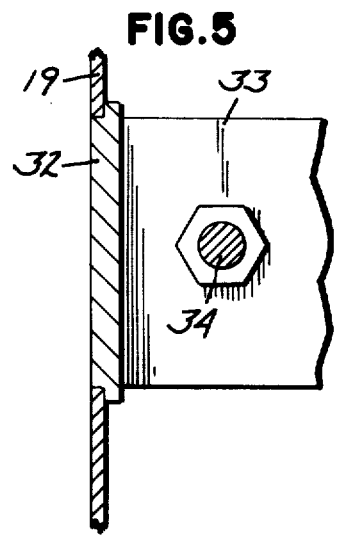
FIG. 5 is a further enlarged fragmentary section taken on the line 5—5 of FIG. 4.
Figure 8:
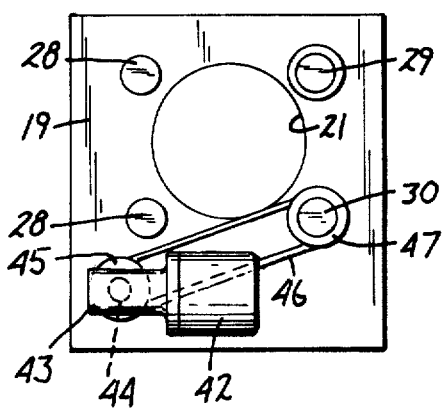
FIG. 8, sheet 3, is a fragmentary view in side elevation of a motor and drive system for a rotary printing drum of this invention.
Figure 6:
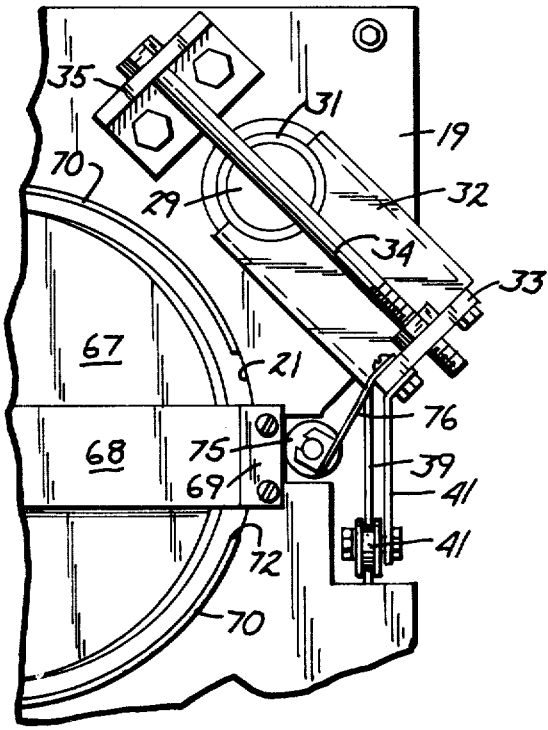
FIG. 6 is an enlarged fragmentary view in elevation as seen from the line 6—6 of FIG. 3, and inverted.

The endless belt 25 is made from flexible elastic material and includes a feeding flight 38 that is entrained over a circumferentially extended portion of the drum 23, and a return flight 39 that is rearwardly spaced from the feeding flight 38. As shown particularly in FIG. 2, the feeding flight 38 holds the drum 23 in rolling engagement with the support rolls 24. Tension of the belt 25 is adjusted by manipulation of the lock nut equipped bolts 34. It will be noted that the upper feed roll 26 is crowned, that is, the diameter of the roll 26 is greater at its longitudinally central portion than at its opposite ends adjacent the flanges 32 thereof. This tends to urge the belt 25 toward an axially centered position on both of the feed rolls 26 and 27 during rotation of the rolls 26 and 27. Should the belt 25 tend to gravitate toward one end or the other of the rolls 26 and 27, compensation for such movement may be had by adjusting one of the bolts 34 with respect to the other thereof, whereby to tilt the axis of the roll 26 with respect to that of the roll 27. With reference to FIGS. 4, 6 and 7, it will be seen that a pair of guide rolls 40 mounted on brackets 41 secured to the cross member 33, engage the opposite side edges of the return flight 39 of the belt 25, to aid in centering the belt 25 on the feed rolls 26 and 27.

Means for imparting feeding movement to the belt 25 and rotation to the drum 23 comprises an electric motor 42 having speed reduction gearing not shown but within a head 43, a drive shaft 44, a pulley 45 on the motor drive shaft 44, and an endless flexible drive belt 46 entrained over the drive pulley 45 and a second pulley 47 mounted fast on one of the shafts 30 of the lower feed roll 27.

Figure 1:
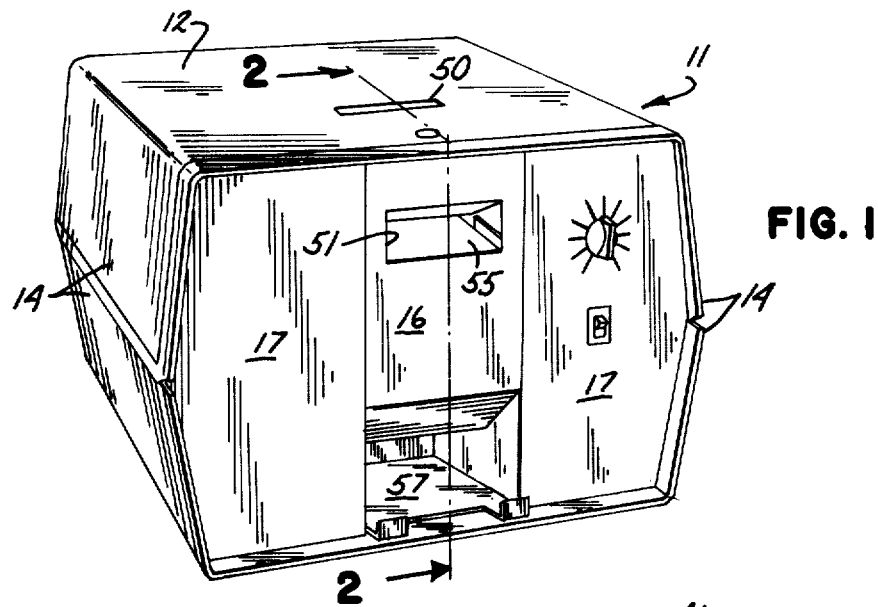
FIG. 1 is a view in perspective of a microfiche exposer produced in accordance with this invention.
Figure 2:
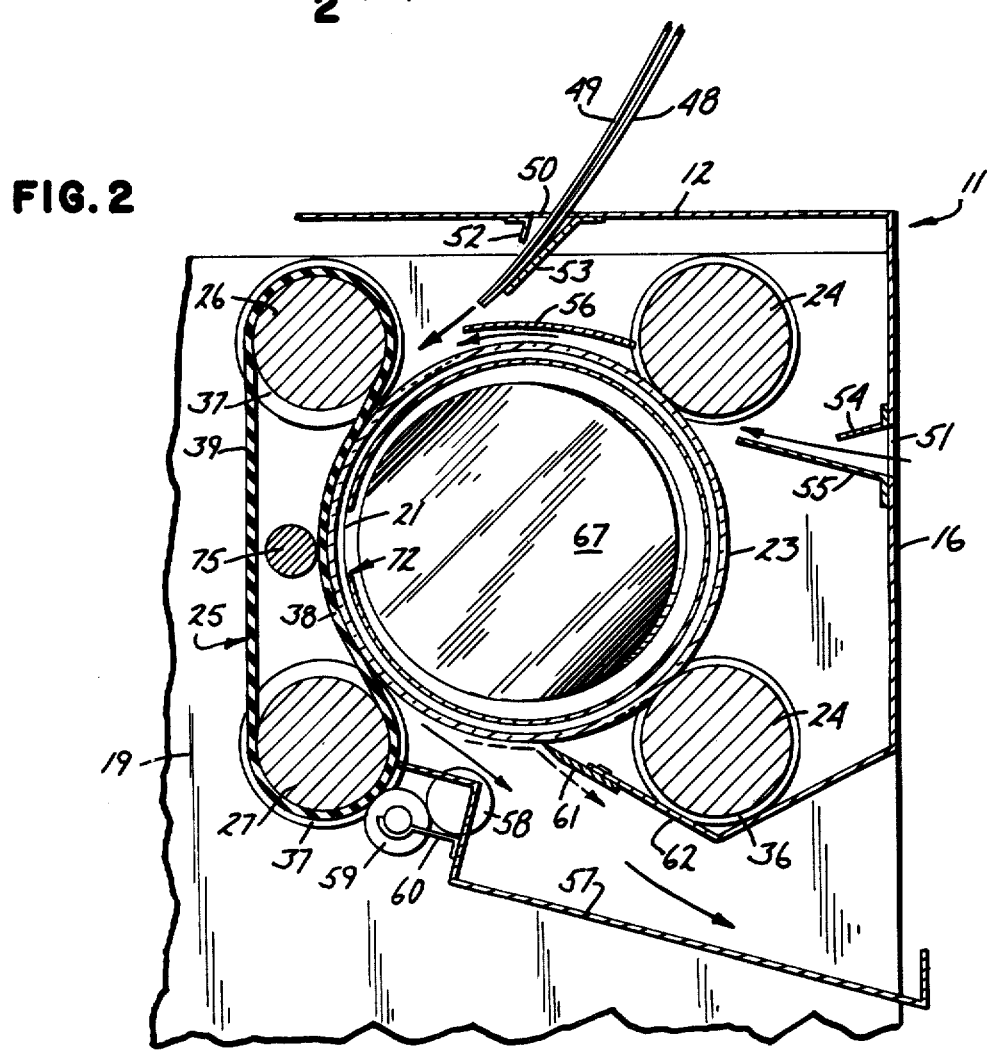
FIG. 2 is an enlarged fragmentary section taken generally on the line 2—2 of FIG. 1, some parts being removed.

The motor 42 drives the belt 25 and drum 23 in a direction indicated by arrows in FIG. 2 to feed a master element or film 48 and a sheet 49 on which information on the film 48 is to be reproduced, in face-to-face engagement and in a downward direction between the outer surface of the drum 23 and the feeding flight 38 of the belt 25. The master film 48 and copy sheet 49 are placed together in face-to-face engagement and fed to the drum 23 and feeding flight 38 selectively through an opening 50 in the top wall 12 or another opening 51 in the front wall section 16. As shown in FIG. 2, the top wall 12 is provided with a pair of guide flanges 52 and 53 adjacent the opening 50 therein, and the front wall intermediate section 16 is provided with a pair of guide flanges 54 and 55. A guide plate 56 overlies the top portion of the drum 23 to further guide the master film and copy sheet, when the same are fed through the opening 51, toward a sandwiched relationship between the belt feeding flight 38 and the outer surface of the drum 23. When the master film 48 and copy sheet 49 are fed inwardly through the opening 51, they are carried between the drum 23 and the upper support roll 24, rearwardly toward the feeding flight 38 of the belt 25. As the superposed film 48 and sheet 49 move downwardly away from the sandwiched relationship between the belt 25 and drum 23, they move toward a receiving tray 57 in the lower portion of the front wall section 16. This movement is enhanced by rotation of a discharge roll 58 suitably journaled in the partitions 18 and 19, the roll 58 being driven from the feed roll 27 by means of an intermediate drive roll 59 that is urged into driving engagement with the roll 58 and the portion of the belt 25 entrained over the feed roll 27, by a pair of resilient brackets 60, one of which is shown in FIG. 2. In the event that the master film 48 should adhere to the outer surface of the drum 23 due to the effect of static electricity or the like, a resilient blade 61 mounted on an upper wall portion 62 of the tray 57 will effectively remove the same from the drum 23 and allow the film and copy sheet to be deposited in the tray 57.

An elongated ultraviolet lamp bulb 63 of conventional type and available commercially, has its opposite ends mounted in sockets 64 carried by a bracket 65 that is secured to the partition 18 by suitable means, not shown. As shown in FIGS. 3 and 7, the bracket 65 supports the ultraviolet bulb 63 in axially outwardly spaced relation to one end of the drum 23, the bracket 65 further supporting a reflector 66 which directs light from the ultraviolet lamp bulb 63 axially into the interior of the drum 23. A second reflector 67 in the form of a flat mirror having an oval outline is mounted within the drum 23 and disposed at generally 45° to the axis of the drum 23 whereby to reflect rays from the ultraviolet lamp bulb 63 radially toward the inner surface of the drum 23 and toward that portion of the drum engaged by the feeding flight 38 of the belt 25. The mirror is held in place by a mounting bracket 68 having opposite ends 69 secured to the housing partition 19. Preferably, the ultraviolet lamp bulb 63 is horizontally disposed and generally at a level with the axis of the drum 23.

For the purpose of insuring that light emanating from the ultraviolet lamp bulb 63 passes through the transparent drum 23 in substantially parallel planes, a cylindrical columniating mask 70 is mounted between the partitions 18 and 19 within and concentric to the drum 23. The columniating mask 70 is provided with one or more tabs 71, see FIG. 9, by means of which the mask is held in place. The mask 70 is formed to provide an axially extending slot or opening 72 disposed substantially at the level of the ultraviolet lamp bulb 63, so that only light passing through the opening 72 reaches the interior surface of the drum 23. With reference to FIG. 9, it will be seen that the opening 72 is tapered from one end to the other, so that the width of the opening 72 varies in a direction circumferentially of the mask 70. The opening 72 assures that only substantially parallel rays of ultraviolet light pass through the drum 23 and the master film 49, so that a sharp image is obtained on the copy sheet 49. While not shown, the reflector mirror 67 may have its reflecting surface curved to further aid in columniating the ultraviolet rays, if desired. The bulb 63 is powered by well known conventional means including a transformer 73 and capacitors 74.

To insure a close face-to-face engagement between the master film 48 and copy sheet 49 during exposure thereof to the ultraviolet rays, and to prevent separation of the master film 48 from the copy sheet 49 which might occur from the generation of gases from the emulsion on the copy sheet, I provide an elongated pressure roll 75 that is mounted in a bearing bracket 76 that is carried by the cross member 33, see FIGS. 4, 6 and 9. Preferably, the pressure roll 75 is made from resilient material, such as rubber. As shown, the pressure roll 75 engages the feeding flight 38 of the belt 25 radially outwardly of the opening 72 in the mask 70.

In view of the fact that a substantial amount of heat is generated by the ultraviolet lamp bulb 63, it is important that as much of the heat as possible be removed from the interior of the housing 11 and particularly from the interior of the drum 23. To effectively cool the interior of the drum 23, as well as the mask 70 and mirror 67, I provide a conventional fan equipped blower 77 that is mounted on the housing partition 19 by means of a bracket 78, the blower 77 having a fan 79 disposed on the axis of the drum 23 for blowing cooling air through the drum 23 and mask 70, and around the reflector mirror 67 toward the ultraviolet lamp bulb 63, as shown in FIGS. 3 and 7. A second motor driven blower 80 is similar to the blower 77, and is mounted on the rear housing wall 15 in the neighborhood of the lamp bulb 63, as shown in FIG. 3. Thus, the blower 80 is disposed to receive heated air primarily from the lamp bulb 63 and move the same outwardly of the housing through a suitable opening, not shown, in the rear housing wall 15. Heat generated by the transformer 73 and capacitors 74 is also drawn outwardly through the blower 80. With the arrangement of blowers 77 and 80, the drum 23 and parts associated therewith are maintained in a relatively cool condition as are the other working parts within the housing 15.

While I have shown and described a commercial embodiment of my microfiche exposer, it will be understood that the same may be adapted for use with film masters of various sizes and for contact printing of any emulsion that is ultraviolet sensitive, on a given contact sheet or other article. It will be further understood that the apparatus shown and described is capable of modification without departure from the spirit and scope of the invention as defined in the claims.

What is claimed is:

1. A microfiche exposer comprising:
   (a) a housing;
   (b) a rotary open-ended tubular drum of transparent material;
   (c) means supporting said drum in said housing for rotation on its own axis;
   (d) a pair of spaced apart feed rolls journaled within said housing on axes parallel to the axis of said drum;
   (e) a flexible belt entrained over said feed rolls and having a feeding flight between said rolls entrained over a circumferentially extended outer surface portion of said drum for reception of a master film and a sensitized sheet in face-to-face engagement between said outer surface portion of the drum and said feeding flight;
   (f) an ultraviolet lamp mounted in said housing axially outwardly of one end of said drum and disposed to direct ultraviolet light axially into said drum;
   (g) a mirror;
   (h) means mounting said mirror in a stationary position within said drum and disposing said mirror to reflect light from said lamp in a direction radially of said drum toward the interior surface of the area thereof engaged by said belt;
   (i) means for imparting film and sheet conveying movement to said belt and rotation to said drum;
   (j) and means for moving a current of cooling air longitudinally through said drum.

2. The microfiche exposer defined in claim 1 further including a generally cylindrical mask within said drum, said mask defining a longitudinal opening of a given width circumferentially of said drum for limiting the area of exposure of light reflected by said mirror to said belt engaging portion of the drum.

3. The microfiche exposer defined in claim 2 in which the longitudinal opening defined by said mask tapers in width from one end of said mask to the other thereof in the direction axially of said drum.

4. The microfiche exposer defined in claim 1 further including a pressure roll disposed on an axis parallel to the axis of said drum and mounting means for said pressure roll yieldingly urging said pressure roll against said feeding flight in a direction radially toward said drum to exert pressure between a film and sensitized sheet carried by said feeding flight and drum.

5. The microfiche exposer defined in claim 1 in which said flexible belt defines with said feeding flight a return flight, further including a pair of guide rolls each engaging a different side edge of said belt on the return flight thereof, to limit movement of said belt in directions axially of said drum and said rolls.

6. The microfiche exposer defined in claim 5 in which one of the belt entraining rolls has an outer diameter which decreases from its longitudinal center to the opposite ends thereof, further including adjustable mounting elements at opposite ends of said one of the rolls operative to move said one of the rolls toward and away from the other roll of said pair and to move each end of said one of the rolls independently of the other end thereof.

7. A microfiche exposer comprising:
   (a) a housing;
   (b) a rotary open ended tubular drum of transparent material;
   (c) a pair of generally vertically spaced support rolls journaled within said housing on axes parallel to said drum and having rolling engagement with circumferentially spaced portions of said drum;
   (d) a pair of generally vertically spaced feed rolls journaled within said housing on axes parallel to the axes of said support rolls and said drum and each laterally spaced from a different one of said support rolls;
   (e) a flexible belt entrained over said feed rolls and having a feeding flight entrained over a circumferentially extended outer surface portion of said drum for reception of a master film and a sensitized sheet in face-to-face engagement between said outer surface of the drum and said feeding flight, and a return flight;
   (f) an ultraviolet lamp mounted in said housing axially outwardly of one end of said drum and disposed to direct ultraviolet light axially into said drum;
   (g) a mirror;
   (h) means mounting said mirror in a stationary position within said drum and disposing said mirror to reflect light from said lamp in a direction radially of said drum toward the interior surface of the area thereof engaged by said belt;
   (i) means for imparting film and sheet conveying movement to said belt and rotation to said drum;
   (j) and means for moving a current of cooling air longitudinally through said drum.

* * * * *